July 27, 1948.
E. L. KENT
2,446,047
FLASH ILLUMINATED STRIPED PATTERN DIRECT READING
STROBOSCOPE FOR WAVE FREQUENCY MEASUREMENTS
Filed Aug. 2, 1944
2 Sheets-Sheet 1
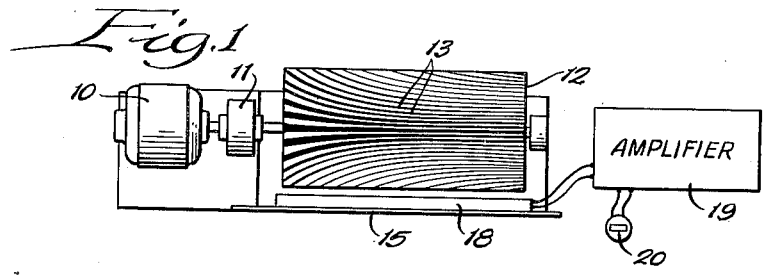
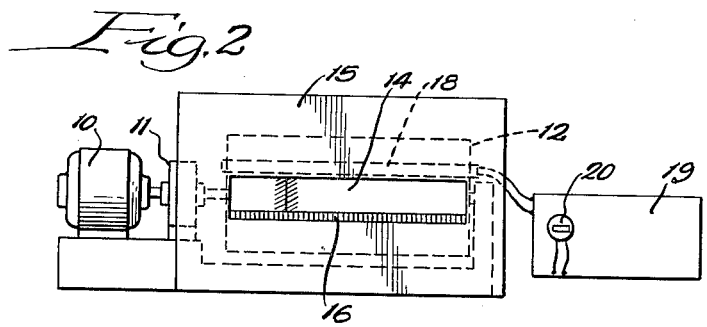
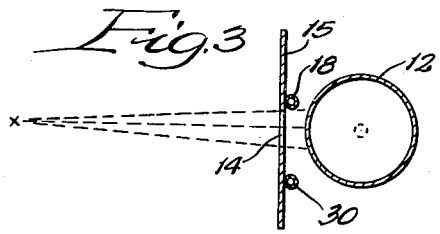 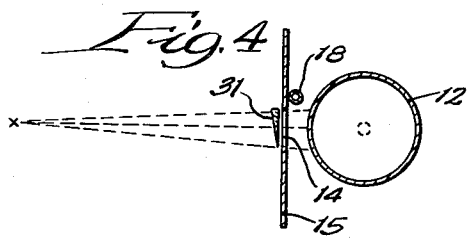
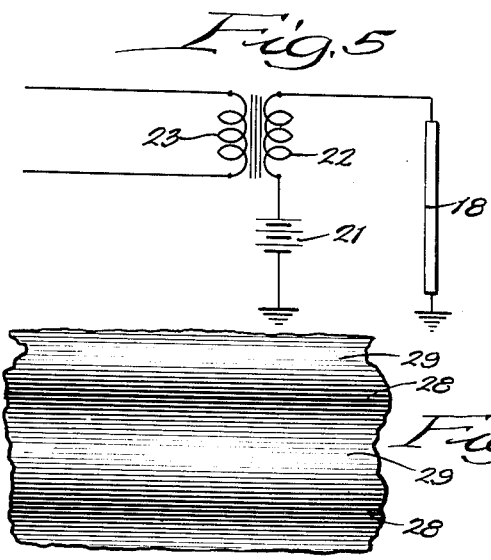
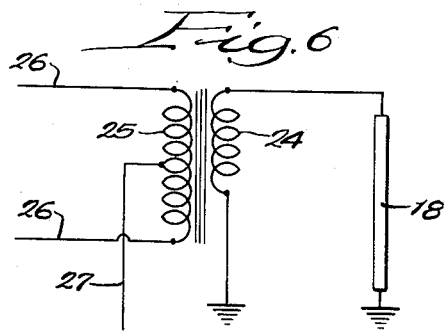
Inventor:
Earle L. Kent,
By Dawson, Ooms & Booth,
Attorneys.

Patented July 27, 1948

2,446,047

UNITED STATES PATENT OFFICE 2,446,047

FLASH ILLUMINATED STRIPED PATTERN DIRECT READING STROBOSCOPE FOR WAVE FREQUENCY MEASUREMENT

Earle L. Kent, Elkhart, Ind., assignor to C. G. Conn, Ltd., Elkhart, Ind., a corporation of Indiana Application August 2, 1944, Serial No. 547,795

13 Claims. (Cl. 88—14)

This invention relates to stroboscopes and more particularly to apparatus for visually indicating the characteristics of audible or like waves.

One of the objects of the invention is to provide a stroboscope which will directly indicate any frequency within its range.

Another object of the invention is to provide a stroboscope having a movable pattern in which the number of pattern segments varies gradually from one side of the pattern to the other.

Still another object is to provide a stroboscope which will simultaneously indicate a plurality of frequencies such as the fundamental and the several harmonics of an audible tone.

A further object of the invention is to provide a stroboscope which will indicate both the frequency and the amplitude of a wave to be measured.

A still further object of the invention is to provide a stroboscope including a light whose intensity varies with the amplitude of a wave to be measured and which illuminates a pattern having alternate light and dark segments merging into each other sinusoidally.

A still further object of the invention is to provide a stroboscope in which a gaseous discharge light is maintained at a neutral illumination level and is varied from said level by a wave to be measured.

The above and other objects and advantages of the invention will be more readily apparent from the following description when read in connection with the accompanying drawing, in which—

Figure 1 is a top plan view of one form of apparatus embodying the invention;

Figure 2 is a front elevation;

Figures 3 and 4 are partial transverse sections illustrating different methods of indicating light intensities;

Figures 5 and 6 are alternative wiring diagrams for operating the light;

Figure 8 is a partial developed view of an alternative pattern form.

Figure 7:
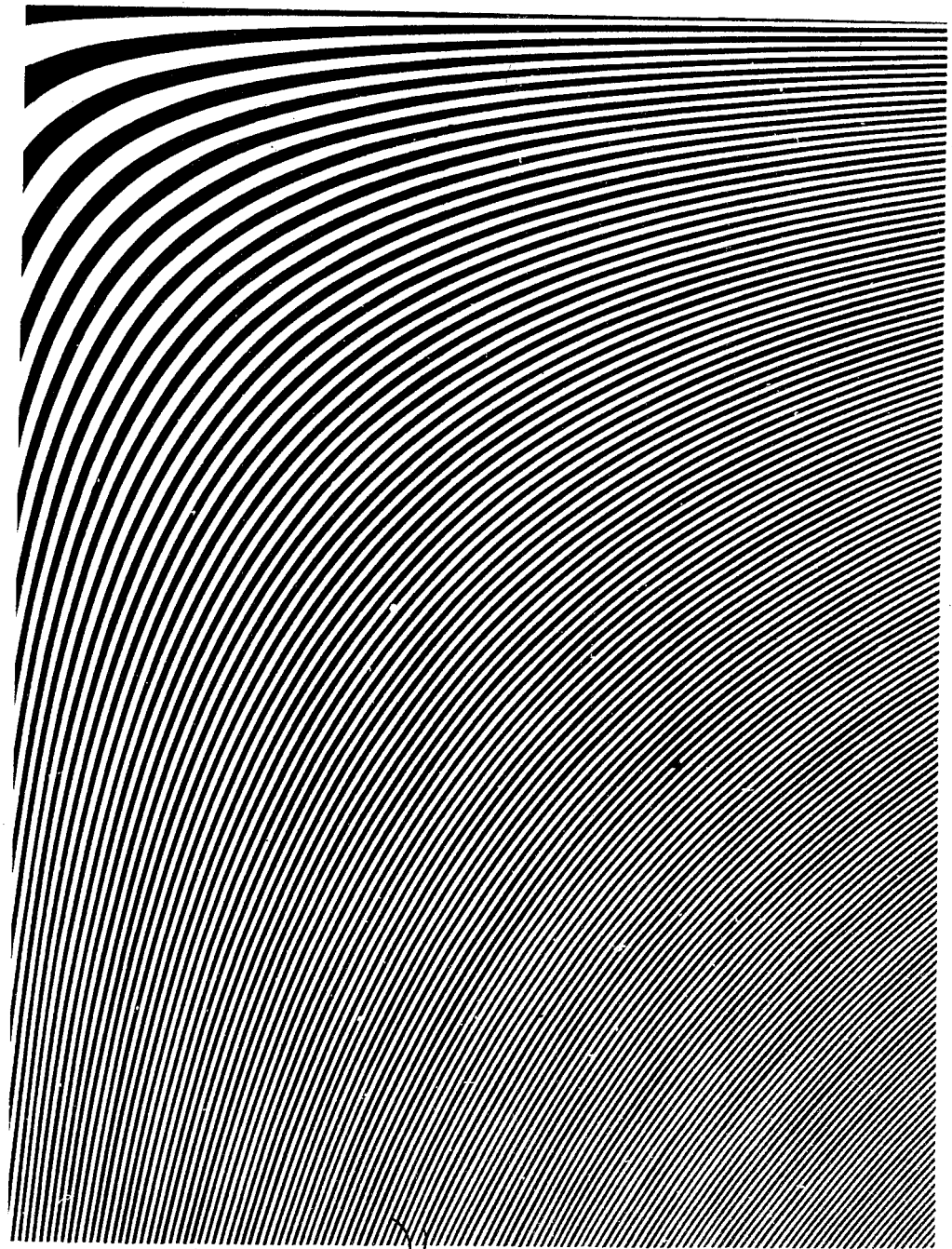
Figure 7 is a developed view of a pattern.

The stroboscope as shown in Figures 1 and 2, comprises a pattern driven at a substantially constant speed by a motor 10 of a constant speed type such as a synchronous motor. The motor may be energized from any convenient source such as the usual regulated 60 cycle voltage available commercially or from a tuning fork generator or like alternating current source. The motor drives a rotating pattern thru a gear box 11 which may be a variable speed gear box to extend the range of the instrument.

The pattern as shown is preferably mounted on a cylindrical drum 12 arranged with its axis horizontal. The drum carries a pattern as more particularly illustrated in Figure 7, which includes a plurality of spaced dark lines 13 on a light background. The lines lie at angles to each other so that certain of the lines as shown at the top of Figure 7, extend substantially parallel to the axis of the cylinder, while others of the lines as at the lower part of Figure 7, lie at an acute angle to the cylinder axis. Preferably, the lines are hyperbolically curved as shown and are made of varying width so that the segments intersected by a plane transverse to the cylinder axis will be alternately light and dark and will have the same circumferential extent.

In applying the pattern to the cylinder, two pattern portions like that shown in Figure 7, one of which is a mirror image of the other, are connected together in end to end relation with the axial lines at the ends of the patterns together and the sharply angular lines at the opposite ends of the patterns together. In this way, a pattern is provided in which the number of segments about the circumference of the cylinder increases gradually from one end of the cylinder to the other in an infinite number of steps. The hyperbolic shape of the lines produces a uniform rate of increase along the length of the cylinder and across the pattern so that different frequencies can be read directly on a linearly graduated scale.

The pattern is preferably observed thru an elongated opening 14 in a rectangular shield 15 mounted in front of the cylinder. The frequencies may be read on a scale 16 carried by the shield adjacent the opening and linearly graduated in terms of frequencies corresponding to the range of the instrument. In case the gear box 11 is a variable speed gear box or other similar means are provided for changing the speed of the cylinder, the scale 16 is simultaneously changed to indicate a different range of frequencies corresponding to the speed of the cylinder.

The pattern is illuminated by a light carried by the shield 15 and which is preferably in the form of a gaseous discharge tube such as a neon tube. As shown, a tube 18 is carried by the shield 15 adjacent the upper edge of the opening 14 to illuminate the cylinder. The exact location of the tube is not important so long as it illuminates a visible portion of the cylinder and it could, if preferred, be mounted on the interior of the cylinder which would then be made of transparent or translucent material. The frequency and intensity of flashing of the tube is controlled by a wave to be measured which may be any desired type of wave. In the case of an audible wave, the tube is preferably controlled thru an amplifier 19 and a microphone 20 to flash at a frequency and with an intensity proportional to the frequency and amplitude of a tone picked up by the microphone.

According to the present invention the tube 18 is illuminated at all times at a neutral level which is increased and decreased according to the amplitude of the wave to be measured. One circuit for providing this control is partially illustrated in diagram in Figure 5, in which the tube 18 is supplied with a constant D. C. voltage by a battery 21 to maintain the tube at its neutral level. A transformer secondary winding 22 is connected in circuit with the tube and is coupled to a primary winding 23 across which the output signal from the amplifier 19 is impressed. When a signal is impressed on the winding 23, it will alternately increase and decrease the total effective voltage on the tube 18 as the signal voltage changes from positive to negative alternately to increase and decrease its level of illumination. Voltages are selected which will vary the illumination of the tube in direct proportion to changes in voltage so that the variation in illumination will be directly proportional to the strength of the signal impressed on the winding 23.

An alternative circuit arrangement is shown in Figure 6 in which the tube 18 is supplied with a high frequency alternating current of constant amplitude from a transformer whose secondary 24 is connected in circuit with the tube and whose primary 25 is supplied thru wires 26 with a high frequency constant amplitude voltage. The high frequency voltage on the transformer primary is modulated by impressing on the primary the relatively lower frequency wave to be measured thru a wire 27 connected to the midpoint of the primary winding. With this construction, it will be noted that the lamp has a high frequency flicker at the frequency of the voltage supplied thru the lines 26. The frequency of this flicker, however, is normally high enough so that it causes no visibly perceptible interference with operation of the stroboscope.

In utilizing the apparatus to indicate both the frequency and amplitude of a wave, the pattern is preferably formed as indicated in the partial showing of Figure 8. In this figure there are illustrated portions of two pattern lines, the pattern having alternate dark and light segments 28 and 29 merging into each other sinusoidally. The segments may be arranged in the form of lines such as the lines 13, or may be in distinct rings each having a different number of segments around the cylinder. In either case, when a sinusoidal variation is provided, the intensity of illumination of the pattern may be directly observed and will correspond with the amplitude of the wave controlling the light tube 18.

With a sinusoidally varying pattern as shown in Figure 8 illuminated by a sinusoidally varying light source, the light reflected by or transmitted through the pattern is proportional to $[AB \sin 2\pi ft] [C \sin (2\pi ft + \theta)]$ where $A$ is the maximum variation in pattern intensity in terms of light reflection or transmission, $B$ is the steady state intensity of the light source, $f$ is the frequency of the pattern variation, $C$ is the maximum variation in intensity of the light source, an $\theta$ is the phase angle between the pattern variations and light source variations. This product multiplies out to $$\tfrac{1}{2} BC \cos \theta - \tfrac{1}{2} AB \sin 4ft$$

The first term is a steady term varying with $\cos \theta$ and when $\theta$ is zero, as occurs at a point in the pattern where the frequency of the pattern equals the frequency of the light source, its value is directly proportional to $C$. The second term is a high frequency sine wave which to the eye or to any averaging type pickup will average zero. Since any frequencies other than $f$ will be sine or cosine terms having an average value of zero, an accurate measure of the intensity of the particular frequency $f$ is obtained without interference from harmonics which may be present in the wave to be measured. With non-sinusoidal patterns it will be apparent that such harmonics will affect the reflected or transmitted light.

Figure 3 illustrates one method of measuring the intensity of illumination of the pattern in which a biasing light 30 is mounted on the shield 15 in a position to illuminate a portion of the pattern visible thru the slot 14. The bias light 30 provides a steady illumination and is preferably a filament type light controllable thru a rheostat or the like to vary the intensity of its illumination. In utilizing this construction the intensity of the light 30 is gradually increased until its intensity is sufficient to mask the changes in intensity provided by the light 18 so that a pattern segment which would normally appear stationary under illumination from the light 18 alone cannot be seen. By noting the adjustment of the light 30, the intensity of illumination of the light 18 can be directly determined.

Figure 4 illustrates another arrangement for determining the intensity of illumination in which an optical wedge 31 graduated vertically is movable in front of a slot 14. By adjusting the wedge until the pattern just becomes invisible, the intensity of illumination of the pattern can be directly read on the vertical graduation on the wedge.

In using the apparatus a tone to be analyzed may be impressed on the microphone 20 to cause the light 18 to flash and illuminate the pattern on the cylinder 12. The frequency of flashing of the light will be the same as or a multiple, depending upon the amplifier, of the frequency of the tone. Thus that portion of the pattern in which the segments are changing color at the same rate as the flashing of the light will appear to be stationary. The appearance of the pattern will be as indicated in Figure 2 with a relatively sharp stationary line bounded on each side by pattern portions which appear to be moving at a slow rate in opposite directions. These moving portions are produced by pattern parts which are slightly above and slightly below synchronism, the stationary part in the center being in exact synchronism with the flash of the light.

In the event a complex tone is impressed on the microphone the several frequencies going to make up the tone will appear simultaneously on the pattern in a series of bands which appear to be stationary. The strength of the several harmonics in such a tone will be indicated by the intensity of illumination of the corresponding portion of the pattern. Thus, a complex wave can be analyzed both as to the frequencies in its make-up and the relative intensities of the several frequencies. For exact indication of intensities a sinusoidally varying pattern is preferably employed with an indicating means such as those shown in Figures 3 and 4, although some indication of intensity can be obtained with a sharp pattern of the type shown in Figure 7.

While several embodiments of the invention have been shown and described in detail herein, it will be understood that these are illustrative only and are not intended as definition of the scope of the invention, reference being had for this purpose to the appended claims.

What is claimed is:

1. A stroboscope comprising a light, means for intermittently lighting the light at a frequency proportional to the frequency of a wave to be measured, a cylinder adjacent the light, means for driving the cylinder at a substantially constant speed, and a pattern on the cylinder including a series of spaced lines each lying at a small acute angle to adjacent lines with some of the lines extending the full axial length of the pattern and others having an axial projected length less than the pattern, the lines being of such varying width throughout their lengths as to provide a gradually increasing number of pattern segments of equal width and equally spaced circumferentially of the cylinder at successive points spaced axially along the pattern.

2. A stroboscope comprising a light, means for intermittently lighting the light at a frequency proportional to the frequency of a wave to be measured, a cylinder adjacent the light, means for driving the cylinder at a substantially constant speed, and a pattern on the cylinder including a pair of pattern portions connected end to end circumferentially of the cylinder one of which is a mirror image of the other, each of said pattern portions having a series of spaced lines thereon lying at small acute angles to each other and of such varying width throughout their lengths as to provide a gradually increasing number of pattern segments of equal width and equally spaced circumferentially of the cylinder at successive points spaced axially along the cylinder.

3. A stroboscope comprising a light, means for intermittently lighting the light at a frequency proportional to the frequency of a wave to be measured, a cylinder adjacent the light, means for driving the cylinder at a substantially constant speed, and a pattern on the cylinder including a pair of pattern portions connected end to end circumferentially of the cylinder one of which is a mirror image of the other, each of said pattern portions having a series of spaced hyperbolically curved lines thereon, each of said lines lying at a small acute angle to the adjacent lines and being of such varying width throughout its length as to provide a gradually increasing number of pattern sergments of equal width equally spaced circumferentially of the cylinder at successive points spaced axially along the cylinder, and a scale adjacent the cylinder uniformly graduated in terms of frequency.

4. A stroboscope comprising a light, means for intermittently lighting the light at a frequency proportional to the frequency of a wave to be measured, a cylinder adjacent the light, means for driving the cylinder at a substantially constant speed, and a pattern on the cylinder including a series of spaced hyperbolically curved lines of varying width across the pattern and lying at small acute angles to each other such that projections of the lines in planes transverse to the cylinder axis form alternate light and dark segments equally spaced and of uniform width circumferentially of the cylinder.

5. A stroboscope comprising a light of the gaseous discharge type, means to supply electric current to the light at a substantially constant voltage level to light the light at a neutral illumination level, means to vary the voltage applied to the light at a frequency and to an extent proportional to the frequency and amplitude of a wave to be measured thereby intermittently to vary the illumination level of the light, a pattern including a series of equally spaced dark segments of equal width in the direction of motion of the pattern relative to the light separated by equally spaced light segments of equal width, said light and dark segments merging into each other sinusodially, means to move the pattern past the light, and means to measure the intensity of illumination of the pattern.

6. A stroboscope comprising a light of the gaseous discharge type, means to supply high frequency alternating current of constant amplitude to the light to maintain it at a neutral illumination level, means to modulate the high frequency current with a lower frequency alternating voltage whose frequency and amplitude are proportional to the frequency and amplitude of a wave to be measured, to vary the intensity of illumination, a pattern including a series of equally spaced dark segments of equal width in the direction of motion of the pattern relative to the light source separated by equally spaced light segments of equal width, said light and dark segments merging into each other sinusodially, and means to move the pattern past the light.

7. A stroboscope comprising a light, means for flashing the light at a frequency proportional to the frequency of a wave to be measured, means adjacent the light to move a pattern past the light at a substantially uniform speed throughout its width, and a pattern moved past the light by said means and including a series of continuous lines each of which lies at a small acute angle relative to adjacent lines and each of which is of such varying width as to provide a gradually varying effective width and spacing parallel to the direction of pattern travel from one side of the pattern to the other such that the lines in any given band parallel to the direction of pattern motion are of equal width and spacing.

8. A stroboscope comprising a light, means for flashing the light at a frequency proportional to the frequency of a wave to be measured, means adjacent the light to move a pattern past the light at a substantially uniform speed throughout its width, and a pattern moved past the light by said means and including a series of spaced hyperbolic lines each of which lies at a small acute angle to the adjacent lines and each of which is of such varying width and spacing as to provide a gradually varying width and spacing in the direction of pattern travel from one side of the pattern to the other such that the lines in any given band parallel to the direction of pattern motion are of equal width and spacing.

9. A stroboscope comprising a light, means for flashing the light at a frequency proportional to the frequency of a wave to be measured, means adjacent the light to move a pattern past the light at a substantially uniform speed throughout its width, a pattern moved past the light by said means and including a series of spaced hyperbolic lines each of which lies at a small acute angle to the adjacent lines and each of which is of such varying width and spacing as to provide a gradually varying width and spacing in the direction of pattern travel from one side of the pattern to the other such that the lines in any given band parallel to the direction of pattern motion are of equal width and spacing, and a scale calibrated linearly in terms of frequency mounted adjacent and extending across the pattern.

10. A stroboscope comprising a light, means for flashing the light at a frequency proportional to the frequency of a wave to be measured and with an intensity proportional to the amplitude of the wave, a movable pattern including equally spaced dark segments of equal width in the direction of pattern motion separated by uniformly spaced light segments of equal width, said light and dark segments merging into each other sinusoidally, and means for moving the pattern past the light at a speed such that the pattern segments will pass a given point with a frequency proportional to the frequency of the wave so that the pattern will appear to be stationary.

11. A stroboscope comprising a light, means for flashing the light at a frequency proportional to the frequency of a wave to be measured and with an intensity proportional to the amplitude of the wave, a movable pattern including equally spaced dark segments of equal width in the direction of pattern motion separated by uniformly spaced light segments of equal width, said light and dark segments merging into each other sinusoidally, means for moving the pattern past the light at a speed such that the pattern segments will pass a given point with a frequency proportional to the frequency of the wave so that the pattern will appear to be stationary, and means adjacent the pattern to measure the average intensity of illumination thereof.

12. A stroboscope comprising a light, means for flashing the light at a frequency proportional to the frequency of a wave to be measured and with an intensity proportional to the amplitude of the wave, a movable pattern including equally spaced dark segments of equal width in the direction of pattern motion separated by uniformly spaced light segments of equal width, said light and dark segments merging into each other sinusoidally, means for moving the pattern past the light at a speed such that the pattern segments will pass a given point with a frequency proportional to the frequency of the wave so that the pattern will appear to be stationary, and an optical wedge adjacent the pattern varying in the direction of pattern motion through which the pattern may be observed to determine the intensity of illumination of the pattern, the wedge having a scale calibrated in the direction of pattern motion.

13. A stroboscope comprising a light, means for flashing the light at a frequency proportional to the frequency of a wave to be measured and with an intensity proportional to the amplitude of the wave, a movable pattern including equally spaced dark segments of equal width in the direction of pattern motion separated by uniformly spaced light segments of equal width, said light and dark segments merging into each other sinusoidally, means for moving the pattern past the light at a speed such that the pattern segments will pass a given point with a frequency proportional to the frequency of the wave so that the pattern will appear to be stationary, a steady light source adjacent the pattern to illuminate it, and means to adjust the intensity of the steady light source to compare the intensities of illumination of the light sources.

EARLE L. KENT.

REFERENCES CITED

The following references are of record in the file of this patent:

UNITED STATES PATENTS

| Number | Name | Date |
|---|---|---|
| 2,077,008 | Poole | Apr. 13, 1937 |
| 2,286,030 | Young et al. | June 9, 1942 |
| 2,296,777 | Elton | Sept. 22, 1942 |